US012725742B2

(12) United States Patent
Honda et al.

(10) Patent No.: US 12,725,742 B2

(45) Date of Patent: Sep. 1, 2026

(54) SWITCH DEVICE

(71) Applicant: KABUSHIKI KAISHA TOKAI RIKA DENKI SEISAKUSHO, Aichi (JP)

(72) Inventors: Tomoya Honda, Aichi (JP); Hideyuki Myojo, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 273 days.

(21) Appl. No.: 18/620,540

(22) Filed: Mar. 28, 2024

(65) Prior Publication Data

US 2024/0355558 A1 Oct. 24, 2024

(30) Foreign Application Priority Data

Apr. 21, 2023 (JP) ................................ 2023-070220

(51) Int. Cl.

*H01H 13/04* (2006.01)
*H01H 13/14* (2006.01)
*H01H 13/32* (2006.01)

(52) U.S. Cl.

CPC ............ *H01H 13/04* (2013.01); *H01H 13/14* (2013.01); *H01H 13/32* (2013.01)

(58) Field of Classification Search

CPC ........ H01H 13/00; H01H 13/02; H01H 13/04; H01H 13/28; H01H 13/50; H01H 13/14; H01H 13/32; H01H 13/52; H01H 13/70; H01H 3/02; H01H 3/12; H01H 2003/00; H01H 2003/02; H01H 2003/12; H01H 2009/02; H01H 2013/00; H01H 2013/02; H01H 2013/04; H01H 2013/50; H01H 2013/52

USPC ........................................................ 200/293

See application file for complete search history.

(56) References Cited

U.S. PATENT DOCUMENTS

| | | | | |
|---|---|---|---|---|
| 5,895,901 | A | 4/1999 | Watanabe et al. | |
| 7,196,280 | B2 * | 3/2007 | Rochon ................. | H01H 13/40 200/406 |
| 9,299,512 | B2 | 3/2016 | Fangmann et al. | |
| 9,646,786 | B1 | 5/2017 | Feng | |
| 2023/0415032 | A1 | 12/2023 | Yu | |

FOREIGN PATENT DOCUMENTS

| | | | |
|---|---|---|---|
| CN | 204441139 | U | 7/2015 |
| JP | H10-92260 | A | 4/1998 |
| KR | 10-2009-0064324 | A | 6/2009 |
| WO | 2022/160488 | A1 | 8/2022 |

* cited by examiner

*Primary Examiner* — Anthony R Jimenez

(74) *Attorney, Agent, or Firm* — Studebaker Brackett PLLC

(57) ABSTRACT

A switch device includes a housing, an operating body that is held by the housing and is pushed into the housing by a push operation, an operating body-side guide portion protruding from a lower surface of the operating body, a housing-side guide portion that protrudes from a bottom surface of the interior of the housing and, together with the operating body-side guide portion, guides movement of the operating body based on the push operation, and an elastic body that is provided between the operating body and the housing on the outer side of the operating body-side guide portion and the housing-side guide portion and applies an elastic force to the housing and the operating body.

12 Claims, 7 Drawing Sheets

SWITCH DEVICE

TECHNICAL FIELD

The present invention relates to a switch device.

BACKGROUND ART

As a known technique, a push-on switch is known, which includes a dome-shaped spring body formed of an elastic material, a push button placed on the spring body and having claw portions at two positions outside a cylindrical portion formed to surround the outer circumference of the dome portion of the spring body, and a case that is formed in a cylindrical shape with an inner diameter slightly larger than the outer diameter of the cylindrical portion of the push button, vertically movably holds the push button and has vertical grooves engaging with the claw portions on the outer circumference of the push button and thereby forming an upward slipping-off prevention portion (see, e.g., PTL 1).

In this push-on switch, a contact substrate on which fixed contacts, etc., are provided is integrated with the case by caulking.

CITATION LIST

Patent Literature

PTL 1: JP H10/92260A

SUMMARY OF INVENTION

The problem of the known push-on switch is that when the claw portions of the push button move due to a push operation while sliding on the case and the contact substrate, the operator feels a sense of resistance caused by the switching between the members on which the claw portions slide, and the operational feeling is thus unstable.

It is an object of the invention to provide a switch device that can provide a stable operational feeling.

According to an aspect of the invention, a switch device comprises:

- a housing;
- an operating body that is held by the housing and is pushed into the housing by a push operation;
- an operating body-side guide portion protruding from a lower surface of the operating body;
- a housing-side guide portion that protrudes from a bottom surface of the interior of the housing and, together with the operating body-side guide portion, guides movement of the operating body based on the push operation; and
- an elastic body that is provided between the operating body and the housing on the outer side of the operating body-side guide portion and the housing-side guide portion and applies an elastic force to the housing and the operating body.

Advantageous Effects of Invention

According to the invention, it is possible to provide a stable operational feeling.

DESCRIPTION OF EMBODIMENTS

Short Summary of the Embodiment

A switch device in the embodiment is generally composed of a housing, an operating body that is held by the housing and is pushed into the housing by a push operation, an operating body-side guide portion protruding from a lower surface of the operating body, a housing-side guide portion that protrudes from a bottom surface of the interior of the housing and, together with the operating body-side guide portion, guides movement of the operating body based on the push operation, and an elastic body that is provided between the operating body and the housing on the outer side of the operating body-side guide portion and the housing-side guide portion and applies an elastic force to the housing and the operating body.

In this switch device, the components sliding when the operating body moves inside the housing due to a push operation are the operating body-side guide portion and the housing-side guide portion. Therefore, it is possible to provide a stable operational feeling as compared to when the sliding member is switched.

Embodiment (General Configuration of a Switch Device 1)

Figure 1:
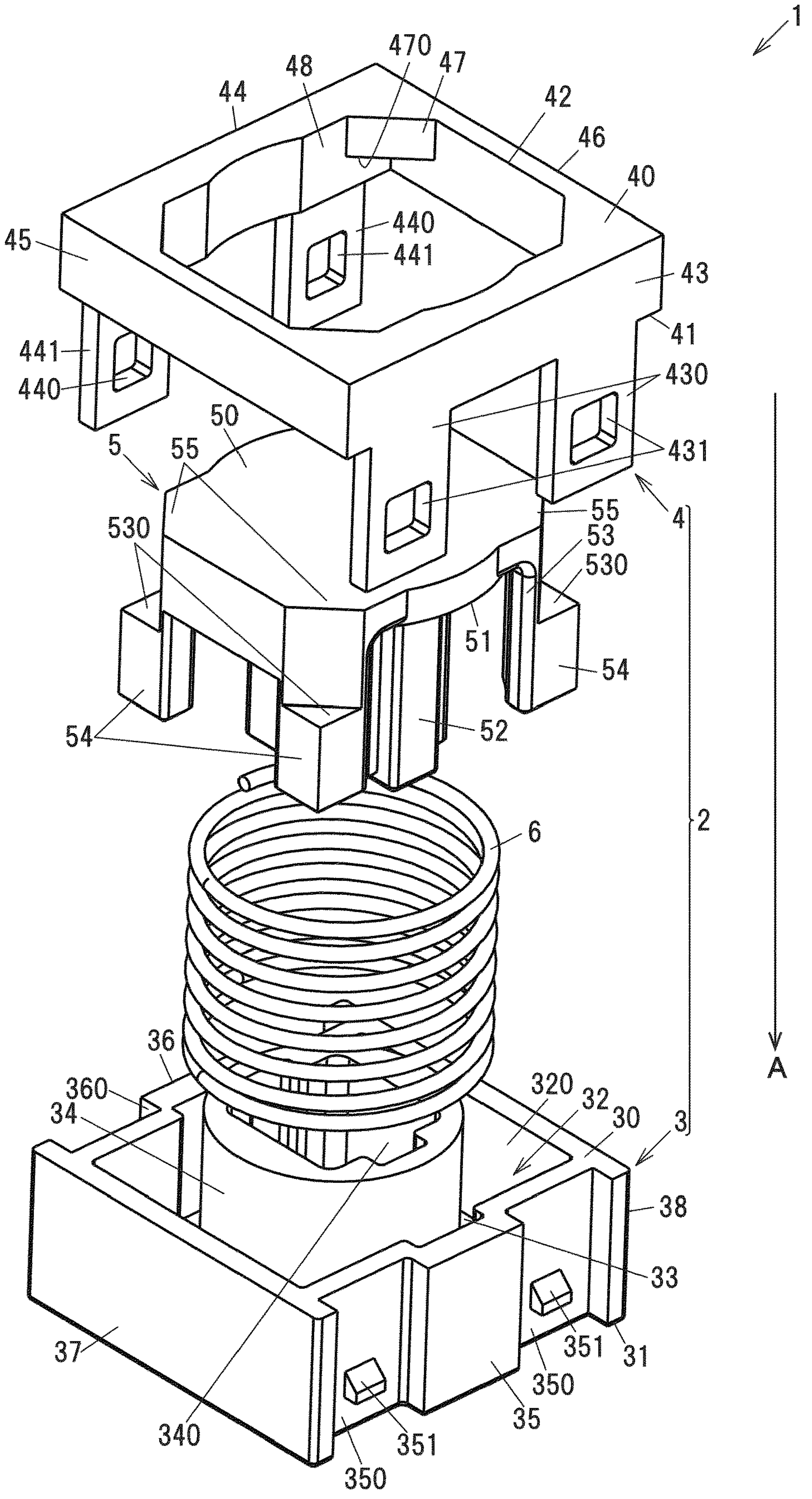
FIG. 1 is an example of an exploded view showing a switch device.
Figure 2A:
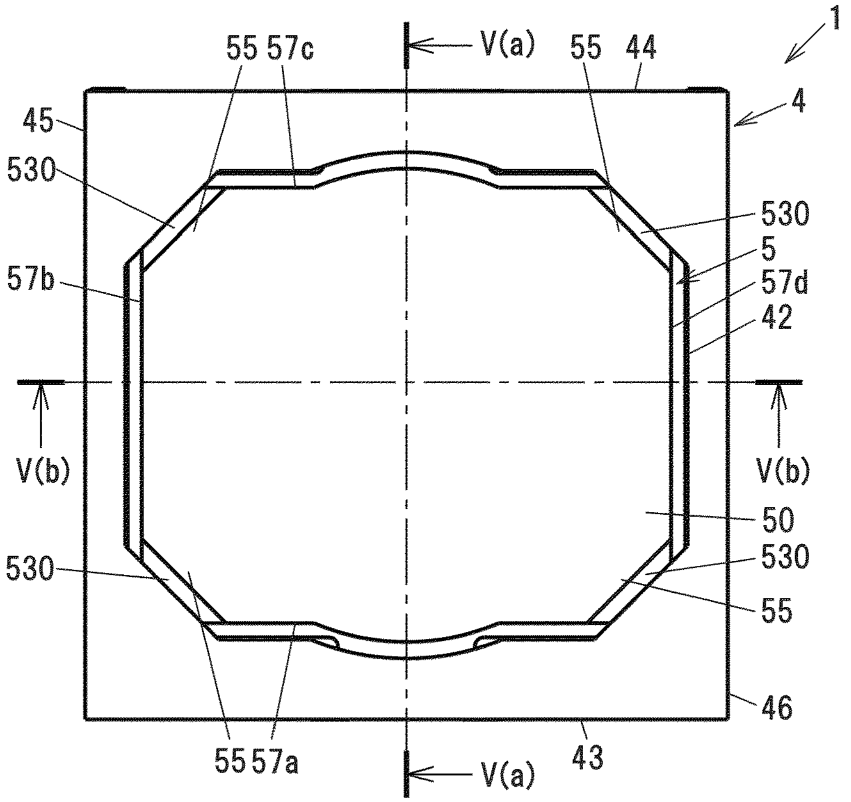
FIG. 2A is an example of a plan view showing the switch device.
Figure 2B:
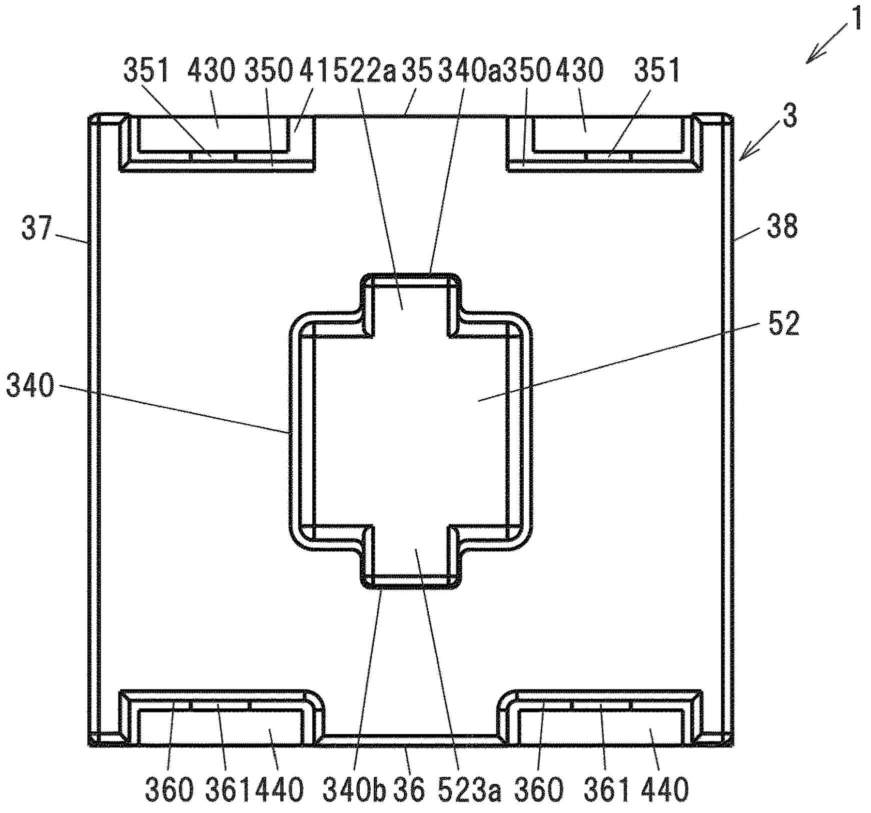
FIG. 2B is an example of a bottom view.
Figure 3A:
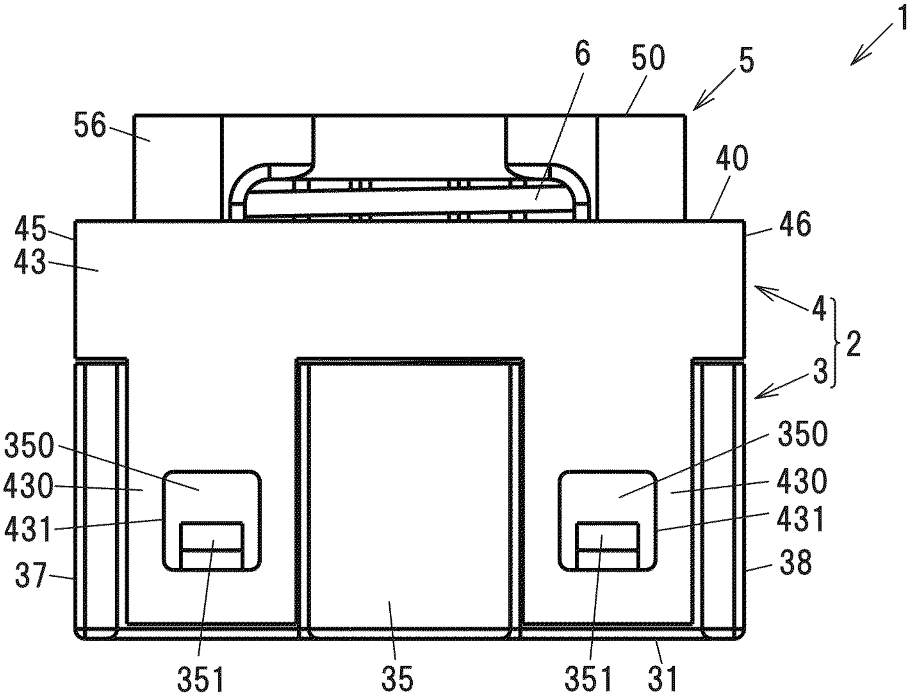
FIG. 3A is an example of a front view showing the switch device.
Figure 3B:
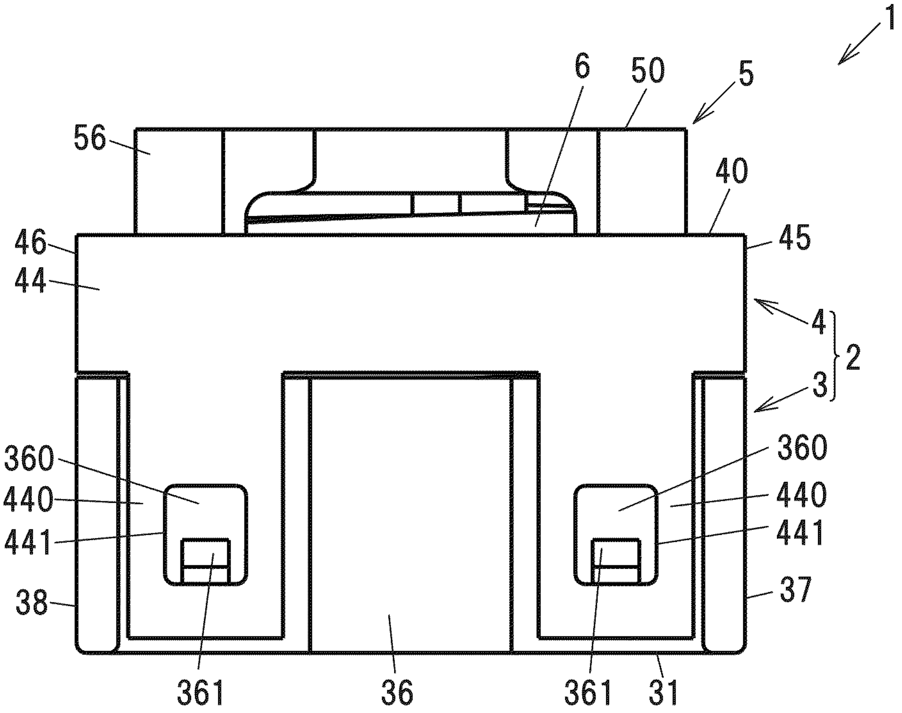
FIG. 3B is an example of a back view.
Figure 4A:
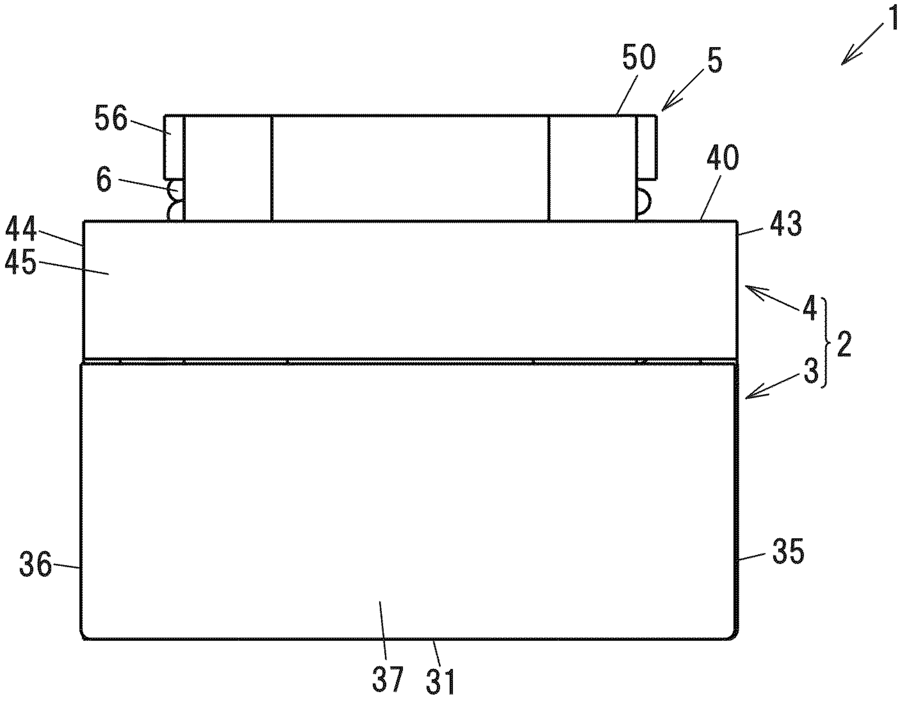
FIG. 4A is an example of a left-side view showing the switch device.
Figure 4B:
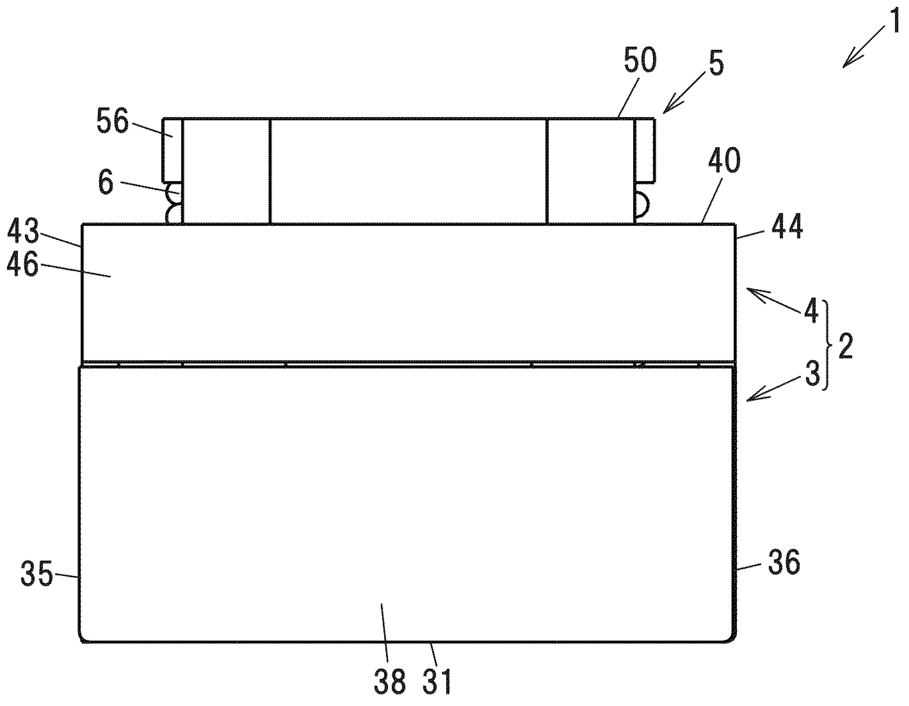
FIG. 4B is an example of a right-side view.
Figure 5A:
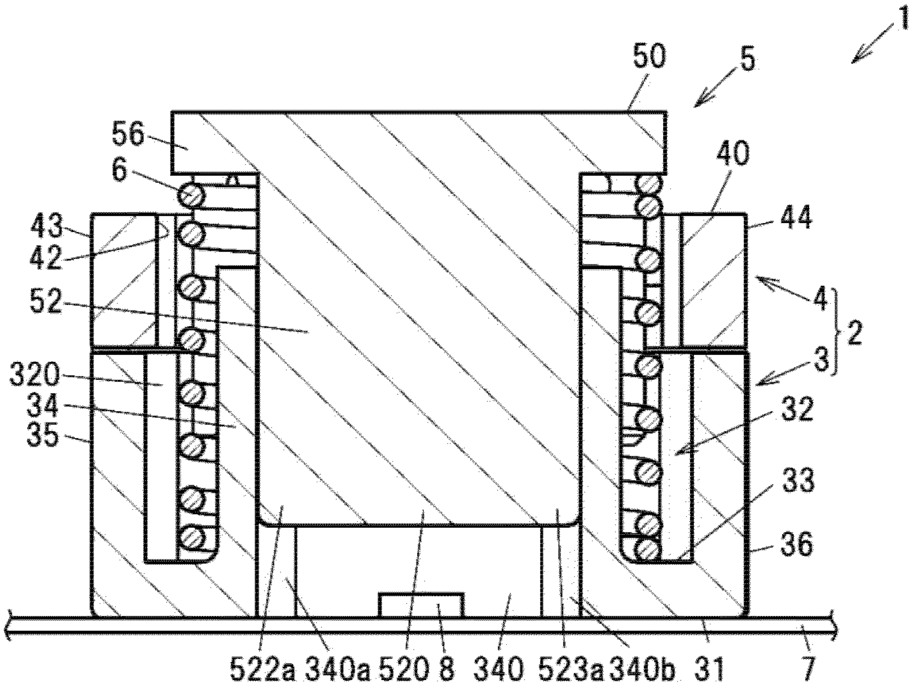
FIG. 5A is an example of a cross-sectional view showing the switch device taken along line V(a)-V(a) in FIG. 2A.
Figure 5B:
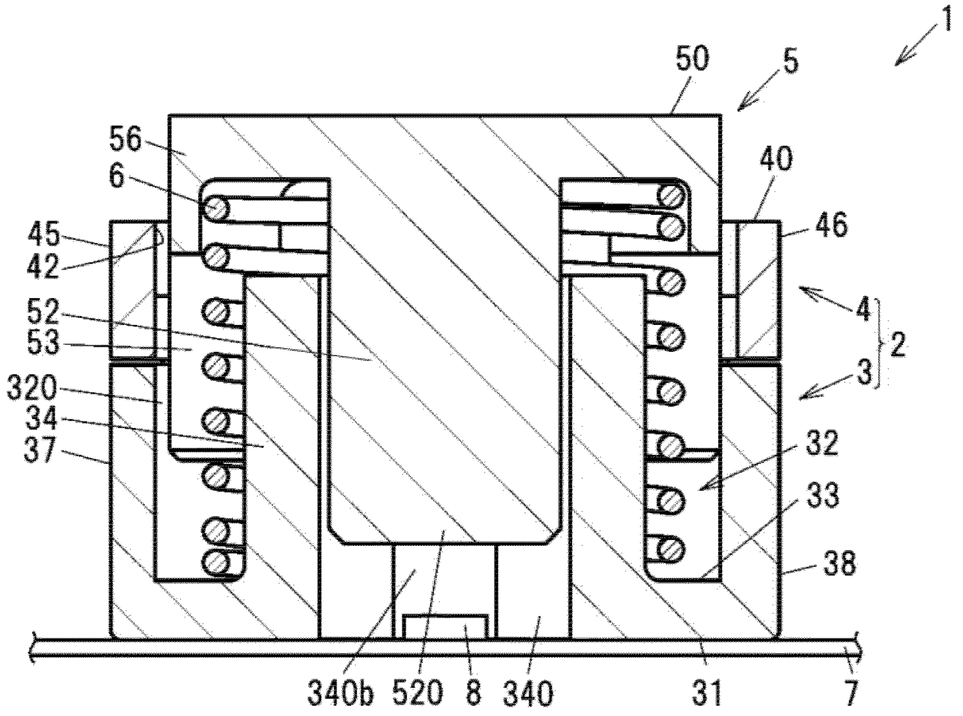
FIG. 5B is an example of a cross-sectional view showing the switch device taken along line V(b)-V(b) line in FIG. 2A.
Figure 6A:
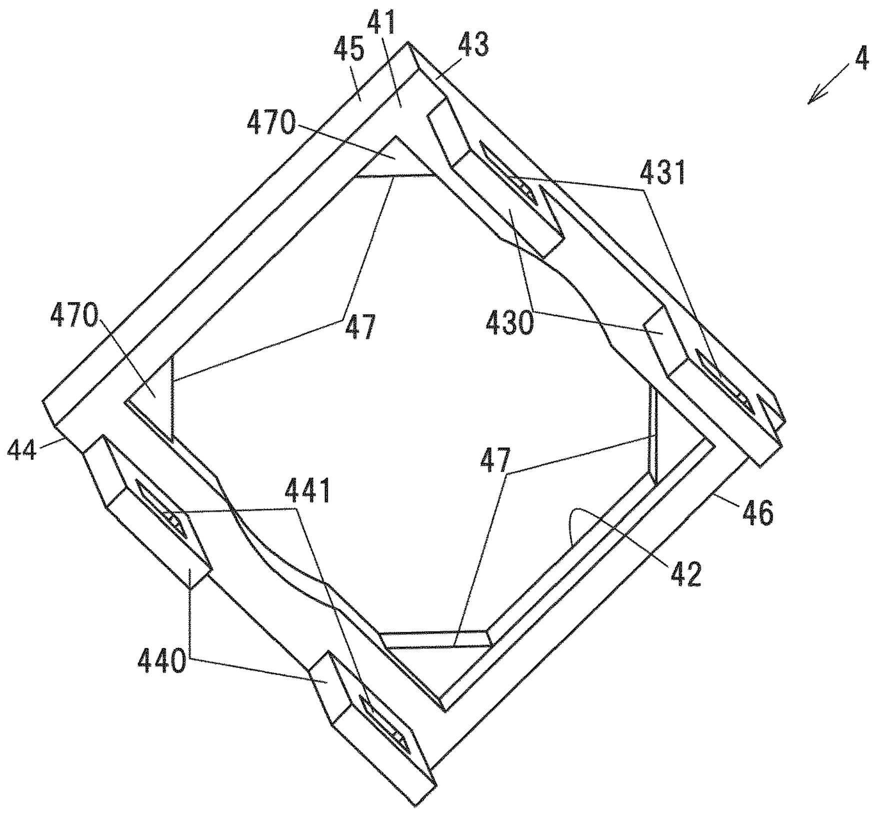
FIG. 6A is a perspective view showing an example of an upper housing.
Figure 6B:
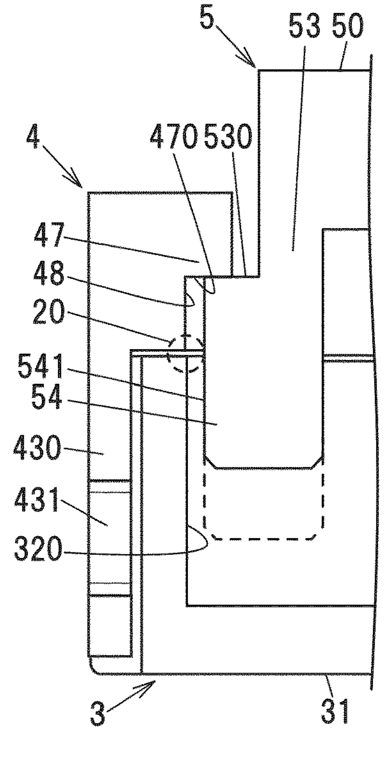
FIG. 6B is an example explanatory diagram illustrating that there is no sliding at the boundary between a lower housing and the upper housing.
Figure 7A:
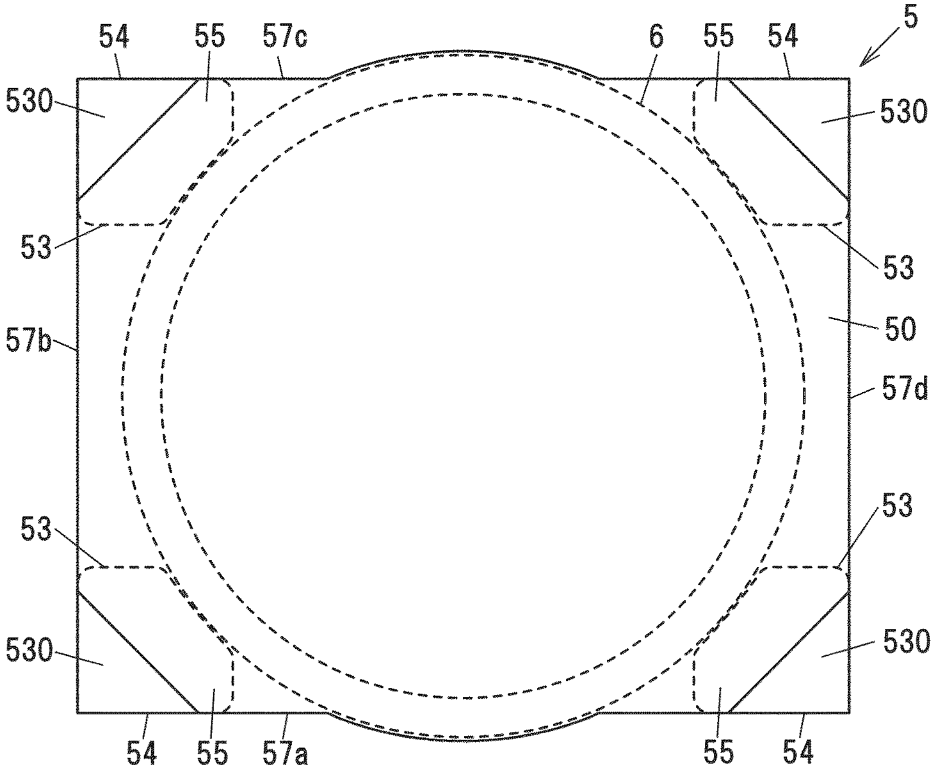
FIG. 7A is a diagram illustrating an example of the positional relationship between the operating body and an elastic body.
Figure 7B:
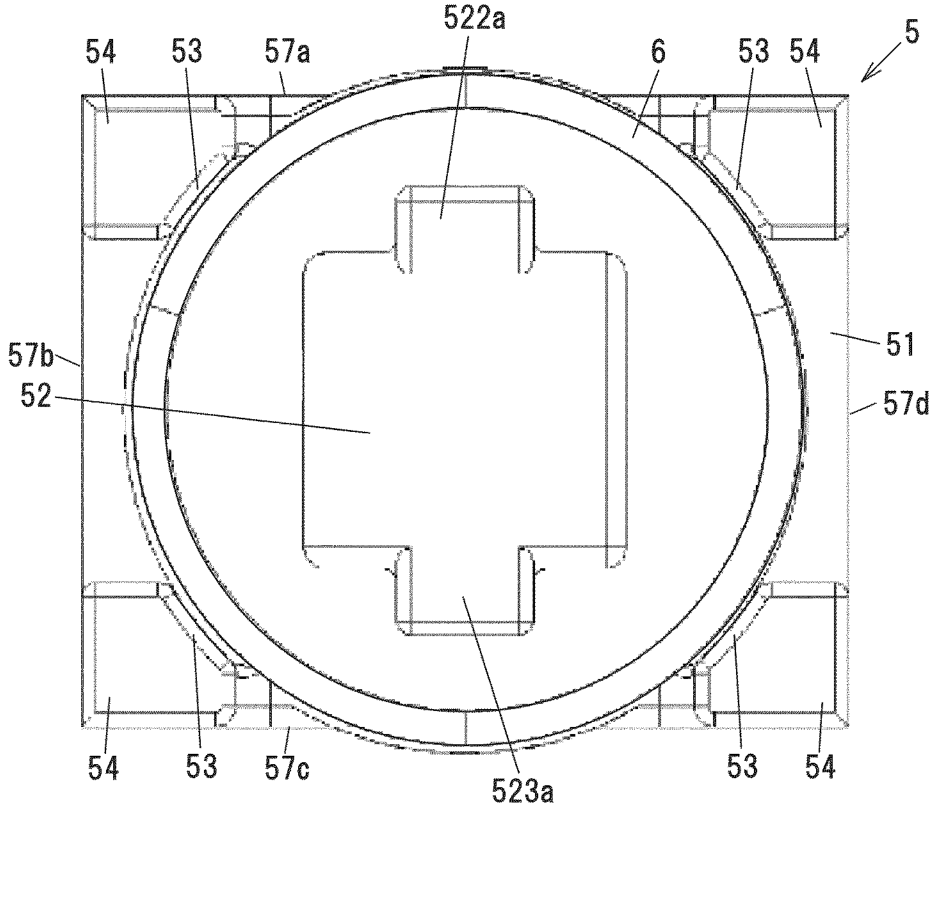
FIG. 7B is a diagram illustrating an example of the lower surface side of the operating body.

FIG. 1 is an example of an exploded view showing a switch device in an embodiment. FIG. 2A is an example of a plan view showing the switch device in the embodiment, and FIG. 2B is an example of a bottom view showing the switch device. FIG. 3A is an example of a front view showing the switch device in the embodiment, and FIG. 3B is an example of a back view showing the switch device. FIG. 4A is an example of a left-side view showing the switch device in the embodiment, and FIG. 4B is an example of a right-side view showing the switch device. FIG. 5A is an example of a cross-sectional view showing the switch device in the embodiment when a cross section taken along line V(a)-V(a) in FIG. 2A is viewed in the direction of arrow, and FIG. 5B is an example of a cross-sectional view showing the switch device when a cross section taken along line V(b)-V(b) line in FIG. 2A is viewed in the direction of arrow. FIG. 6A is a perspective view showing an example of an upper housing of the switch device in the embodiment, and FIG. 6B is an example explanatory diagram illustrating that there is no sliding at the boundary between a lower housing and the upper housing. FIG. 7A is a diagram illustrating an example of the positional relationship between the operating body and an elastic body of the switch device in the embodiment, and FIG. 7B is a diagram illustrating an example of the lower surface side of the operating body.

In each drawing of the embodiment described below, a scale ratio or shape are an example and may be different between the drawings or different from the actual ratio or shape.

As shown in FIG. 1, the switch device 1 is generally composed of a housing 2, an operating body 5 that is held by the housing 2 and is pushed into the housing 2 by a push operation, an operating body-side guide portion 52 protruding from a lower surface 51 of the operating body 5, a housing-side guide portion 34 that protrudes from a bottom surface 33 of the interior 32 of the housing 2 and, together with the operating body-side guide portion 52, guides movement of the operating body 5 based on the push operation, and an elastic body 6 that is provided between the operating body 5 and the housing 2 on the outer side of the operating body-side guide portion 52 and the housing-side guide portion 34 and applies an elastic force to the housing 2 and the operating body 5.

As shown in FIGS. 1 to 4B, the housing 2 has a lower housing 3 including the housing-side guide portion 34, and an upper housing 4 that has an insertion opening 42 for insertion of the operating body 5 and, together with the lower housing 3, holds the operating body 5. The operating body 5 has protruding portions 53 that protrude from the lower surface 51. Each protruding portion 53 has a protruding piece 54 that protrudes outward beyond the insertion opening 42 in a state of being held by the housing 2. The protruding pieces 54 are in contact with the upper housing 4 due to the elastic force of the elastic body 6 before the push operation, and move with the operating body 5 without contacting the upper housing 3 and the lower housing 4 when the push operation is performed.

The operating body-side guide portion 52 is a columnar body. The housing-side guide portion 34 is a cylindrical body having an insertion hole 340 into which the operating body-side guide portion 52 is inserted. The insertion hole 340 is a hole that penetrates the bottom surface 33 of the lower housing 3, as shown in FIG. 2B. The switch device 1 includes an electronic component 8 that is placed in the insertion hole 340 and detects the push operation, as shown in FIGS. 5A and 5B. The electronic component 8 will be described later.

In the present embodiment, the operating body-side guide portion 52 is a columnar body and the housing-side guide portion 34 is a cylindrical body. However, it is not limited thereto. The operating body-side guide portion 52 may be provided as a cylindrical body, and the housing-side guide portion 34 as a columnar body.

(Configuration of the Housing 2)

The housing 2 is formed using a resin material as an example, but it is not limited thereto. One of the lower housing 3 and the upper housing 4 may be formed of a resin material and the other one of a metal material, or both may be formed of a metal material.

The lower housing 3 has a box shape which is open on an upper surface 30 side. The housing 2 is generally rectangular parallelepiped in shape when the lower housing 3 and the upper housing 4 are integrated. That is, the switch device 1 is generally rectangular parallelepiped in shape, but it is not limited thereto. In addition, the housing 2 when viewed from above has a rectangular shape, but may have a square shape or circular shape, and it is not limited thereto.

The Lower Housing 3

As an example, the lower housing 3 is configured such that the distance from a front surface 35 to an opposite back surface 36 is equal to the distance from a left side surface 37 to an opposite right side surface 38, as shown in FIGS. 1 and 2B.

The front surface 35 is provided with two groove portions 350, as shown in FIGS. 1, 2B and 3A. The back surface 36 is provided with two groove portions 360, as shown in FIGS. 1, 2B and 3B. The groove portions 350 and the groove portions 360 are grooves formed from the upper surface 30 to a lower surface 31.

Each of the two groove portions 350 is provided with an attachment claw 351, as shown in FIG. 3A. Likewise, each of the two groove portions 360 is provided with an attachment claw 361, as shown in FIG. 3B.

The lower housing 3 includes the housing-side guide portion 34 which is provided at the center of the interior 32, as shown in FIGS. 5A and 5B. This housing-side guide portion 34 supports the elastic body 6 inserted therearound. The housing-side guide portion 34 is provided with the insertion hole 340 that penetrates from the bottom surface 33 to the lower surface 31 of the lower housing 3.

The insertion hole 340 has a shape corresponding to the operating body-side guide portion 52, as shown in FIG. 2B. Furthermore, the insertion hole 340 has a first recessed portion 340*a*, which is a recessed portion corresponding to a first rib 522*a* (described later), and a second recessed portion 340*b*, which is a recessed groove corresponding to a second rib 523*a* (described later). The first recessed portion 340*a* and the second recessed portion 340*b* are located opposite to each other.

The Upper Housing 4

As an example, the upper housing 4 is configured such that the distance from a front surface 43 to an opposite back surface 44 is equal to the distance from a left side surface 45 to an opposite right side surface 46, as shown in FIGS. 1 and 2A.

The front surface 43 is provided with two attachment pieces 430 that correspond to the two groove portions 350 of the lower housing 3, as shown in FIG. 3A. Likewise, the back surface 44 is provided with two attachment pieces 440 that correspond to the two groove portions 360, as shown in FIG. 3B. The attachment pieces 430 and the attachment pieces 440 have a plate shape and protrude from a lower surface 41.

Each of the two attachment pieces 430 is provided with an attachment opening 431, as shown in FIG. 3A. Likewise, each of the two attachment pieces 440 is provided with an attachment opening 441, as shown in FIG. 3B.

When the upper housing 4 is attached to the lower housing 3, the attachment pieces 430 are inserted into the groove portions 350 of the lower housing 3 and the attachment claws 351 fit into the attachment openings 431. Also, the attachment pieces 440 are inserted into the groove portions 360 and the attachment claws 361 fit into the attachment openings 441. That is, the attachment opening and the attachment claw are configured to snap-fit.

The upper housing 4 includes four corner portions 47, as shown in FIG. 6A. Each corner portion 47 is provided so as to form a part of the insertion opening 42 and has a contact surface 470 which is a lower surface and contacts a contact surface 530 of the protruding piece 54. The corner portion 47 has a triangular prism shape, as an example.

(Configuration of the Operating Body 5)

As shown in FIG. 2A, the operating body 5 has four corners 55 at symmetrical positions on an upper surface 50, has the protruding portions 53 and the protruding pieces 54 below the four corners 55, and is held by the housing 2 by contact between the contact surfaces 530 as the upper surfaces of the protruding pieces 54 and the upper housing 4.

The protruding portion 53 has such a shape that a portion of a triangular prism is cut off from the upper surface 50 to the contact surface 530, as an example. In the switch device 1, when a push operation is not performed, the operating body 5 is pressed against the upper housing 4 by the elastic force of the elastic body 6, and the contact between the contact surfaces 530 and the contact surfaces 470 causes the operating body 5 to be held by the housing 2 and prevents the operating body 5 from slipping out of the housing 2.

The protruding portions 53 and the protruding pieces 54 may be configured as a flange provided around the operating body 5, as an example.

As shown in FIGS. 7A and 7B, at least one pair of opposite sides of the upper surface 50 of the operating body 5, on which the push operation is performed, has a shape corresponding to the elastic body 6. A portion of the elastic body 6 is located below the at least one pair of sides.

The upper surface 50 has a first side 57*a* to a fourth side 57*d* with the front surface 43 of the upper housing 4 as a reference, as shown in FIG. 2A. The one pair of sides mentioned above are the first side 57*a* and the third side 57*c* that correspond to the front surface 43 and the back surface 44, as an example.

The first side 57*a* and the third side 57*c* are bulged in an arc shape at the center so as to correspond to the elastic body 6, as shown in FIGS. 7A and 7B.

In the switch device 1, the housing-side guide portion 34 and the operating body-side guide portion 52, which guide the movement of the operating body 5, are largely provided in the center of the lower housing 3 and in the center of the operating body 5, as shown in FIGS. 5A and 5B. Therefore, the elastic body 6 having a size not sticking out from the operating body 5 when viewed from above can be used in the switch device 1.

An upper portion 56 of the operating body 5 protrudes from an upper surface 40 of the upper housing 4, as shown in FIGS. 3A to 4B. As an example, the upper portion 56 is fitted with a keycap of a keyboard as an input device.

Movement of the Operating Body 5

In the switch device 1, side surfaces 541 of the protruding pieces 54 of the operating body 5 do not contact an inner surface 48 of the upper housing 4 and an inner surface 320 of the lower housing 3, as shown in FIG. 6B. Therefore, the operating body 5 does not move while sliding on the inner surface 48 and the inner surface 320, hence, a sense of resistance caused by switching of members at a boundary 20 between the inner surface 48 and the inner surface 320 is not given to the operator. As indicated by a dotted line in FIG. 6B, the boundary 20 is, as an example, a portion which faces the side surface 541 and is a switching portion between the inner surface 320 and the inner surface 48.

(Configuration of the Elastic Body 6)

The elastic body 6 is a coil spring formed of a metal material, as an example. However, the elastic body 6 is not limited to a coil spring and may be, e.g., a flat spring that accumulates elastic force according to a performed push operation and, when no push operation is performed, releases part of the accumulated elastic force and presses the operating body 5 against the upper housing 4. The material of the elastic body 6 is not limited to a metal material and may be a resin material such as rubber.

One end of the elastic body 6 is held between the four protruding portions 53 and the other end is held by the housing-side guide portion 34, as shown in FIGS. 5A, 5B, 7A and 7B.

(Direction of Assembly)

The switch device 1 is assembled in the direction of arrow A, as shown in FIG. 1. That is, the elastic body 6 is attached to the lower housing 3, the operating body 5 is attached to the attached elastic body 6, the upper portion 56 of the operating body 5 is inserted into the insertion opening 42 while contracting and pushing the elastic body 6 until the attachment claws 351 and the attachment claws 361 fit into the attachment openings 431 and the attachment openings 441, thereby integrating the lower housing 3 with the upper housing 4 and completing assembly of the switch device 1.

(The Electronic Component 8)

The switch device 1 is placed on a printed circuit board 7, as shown in FIGS. 5A and 5B. The electronic component 8 is placed on this printed circuit board 7.

As an example, the electronic component 8 includes a detection element to detect push operation or a light-emitting element to illuminate the operating body 5, etc. In case that the electronic component 8 detects a push operation based on a change in a magnetic field, the operating body 5 may be configured such that an end of the operating body-side guide portion 52 is magnetized or such that the operating body-side guide portion 52 has a hollow portion along the direction of the push operation and a magnet is inserted in the hollow portion, as an example. The electronic component 8 is configured as a magnetic sensor with a magneto-resistive element or a Hall element that detects changes in the acting magnetic field due to a push operation as an example, but it is not limited thereto. The electronic component 8 may be an optical sensor that detects a push operation using light.

The electronic component 8, when illuminating the operating body 5, is configured to include a light-emitting element which converts an electrical signal into light, such as LED (Light Emitting Diode) element. In the case that the electronic component 8 illuminates the operating body 5, the switch device 1 may be configured such that a light guide is inserted into a hollow portion provided in the operating body-side guide portion 52, or such that the operating body-side guide portion 52 is formed using a transparent material through which light is transmitted.

Furthermore, the electronic component 8 may be configured to include a magnetic sensor and a light-emitting element. In this case, the switch device 1 is configured such that an end of the operating body-side guide portion 52 is magnetized and a light guide is inserted into a hollow portion provided therein, as an example.

Furthermore, the electronic component 8 may be a microswitch. In case that the electronic component 8 is a microswitch, an end of the operating body-side guide portion 52 comes into contact with the microswitch.

Effects of the Embodiment

The switch device 1 in the present embodiment can provide a stable operational feeling. In particular, in the switch device 1, the components sliding when the operating body 5 moves due to a push operation are the operating body-side guide portion 52 and the housing-side guide portion 34.

Therefore, it is possible to provide a stable operational feeling as compared to when the sliding member is switched.

In the switch device 1, the elastic body 6 can be placed on the outer side of the operating body-side guide portion 52 and the housing-side guide portion 34 which slide, and the elastic body 6 having a size according to the upper surface 50 of the operating body 5 can be used. Therefore, as compared to when this configuration is not adopted, variation in the operational feeling is suppressed and a stable operational feeling can be given to the operator no matter at which position on the upper surface 50 of the operating body 5 the push operation is performed. Therefore, even if an edge of the upper surface 50 is pressed down, the switch device 1 can give the operator an operational feeling similar to when the center is pressed down.

Since the operating body-side guide portion 52 and the housing-side guide portion 34 of the switch device 1 can be formed larger than in the case where a sliding rib, etc., is provided outside the elastic body, the stroke of sliding movement with push operation can be longer. Therefore, the switch device 1 can provide the operator with an operational feeling with less rattling while keeping the height in the push operation direction low.

Since the switch device 1 can be assembled by attaching the elastic body 6, the operating body 5 and the upper housing 4 in this order to the lower housing 3, the assembly direction is one direction and assembly is easy. In addition, since the switch device 1 is easy to assemble, it is possible to suppress the manufacturing cost.

Although the embodiment and modifications of the invention have been described, these embodiment and modifications are merely examples and the invention according to claims is not to be limited thereto. These new embodiment and modifications may be implemented in various other forms, and various omissions, substitutions and changes, etc., can be made without departing from the gist of the invention. In addition, not all combinations of the features described in these embodiment and modifications are necessary to solve the problem of the invention. Further, these embodiment and modifications are included within the scope and gist of the invention and also within the invention described in the claims and the range of equivalency.

REFERENCE SIGNS LIST

1 SWITCH DEVICE
2 HOUSING
3 LOWER HOUSING
4 UPPER HOUSING
5 OPERATING BODY
6 ELASTIC BODY
8 ELECTRONIC COMPONENT
20 BOUNDARY
30 UPPER SURFACE
31 LOWER SURFACE
32 INTERIOR
33 BOTTOM SURFACE
34 HOUSING-SIDE GUIDE PORTION
40 UPPER SURFACE
41 LOWER SURFACE
42 INSERTION OPENING
47 CORNER PORTION
48 INNER SURFACE
50 UPPER SURFACE
51 LOWER SURFACE
52 OPERATING BODY-SIDE GUIDE PORTION
53 PROTRUDING PORTION
54 PROTRUDING PIECE
55 CORNER
**57*a*** FIRST SIDE
**57*c*** THIRD SIDE
320 INNER SURFACE
340 INSERTION HOLE
470 CONTACT SURFACE
530 CONTACT SURFACE

The invention claimed is:

1. A switch device, comprising:
an upper housing and a lower housing that are connectible by a single pushing operation on the upper housing;
an operating body that is held between the upper and lower housing and is inserted into the lower housing by a push operation, and which includes an operating body-side guide portion protruding from a lower surface of the operating body, and at least one protruding piece that extends laterally with respect to the operating body-side guide portion and that is captured by the upper housing;
a housing-side guide portion that protrudes from a bottom surface of an interior of the lower housing and, together with the operating body-side guide portion, guides movement of the operating body between the upper and lower housing; and
an elastic body that is provided between the operating body and the lower housing on an outer side of the operating body-side guide portion and the housing-side guide portion and applies an elastic force to the upper housing and the operating body,
wherein the operating body comprises four corners at symmetrical positions on an upper surface and four protruding pieces below the four corners, and is held by the upper housing by contact between upper surfaces of the protruding pieces and the upper housing.

2. The switch device according to claim 1, wherein an upper surface of the at least one protruding piece contacts the upper housing, and a lower surface of the at least one protruding piece and an upper surface of the upper housing are coplanar.

3. The switch device according to claim 1, wherein the lower housing, the elastic body, the operating body, and the upper housing are assembled together by the single pushing operation that connects the upper housing to the lower housing.

4. The switch device according to claim 1, wherein the protruding piece is in contact with the upper housing due to the elastic force of the elastic body before the push operation, and moves with the operating body without contacting the upper housing and the lower housing when the push operation is performed.

5. The switch device according to claim 4, wherein at least one pair of opposite sides of an upper surface of the operating body, on which the push operation is performed, has a shape corresponding to the elastic body, and wherein a portion of the elastic body is located below the at least one pair of sides.

6. The switch device according to claim 1, wherein the operating body-side guide portion comprises a columnar body, wherein the housing-side guide portion comprise a cylindrical body comprising an insertion hole into which the operating body-side guide portion is inserted, wherein the insertion hole comprises a hole that penetrates the bottom surface of the lower housing, and wherein the switch device comprises an electronic component that is placed in the insertion hole and detects the push operation.

7. The switch device according to claim 6, wherein the columnar body of the operating body-side guide portion is configured so as to continuously slide within the cylindrical body of the housing-side guide portion during a push operation of the operating body.

8. The switch device according to claim 6, wherein the columnar body of the operating body-side guide portion is configured so as to have different vertical and horizontal dimensions in a top view.

9. The switch device according to claim 1, wherein the housing-side guide portion comprises a columnar body, wherein the operating body-side guide portion comprise a cylindrical body comprising an insertion hole into which the housing-side guide portion is inserted.

10. The switch device according to claim 9, wherein the columnar body of the housing-side guide portion is configured so as to continuously slide within the cylindrical body of the operating body-side guide portion during a push operation of the operating body.

11. The switch device according to claim 9, wherein the columnar body of the housing-side guide portion is configured so as to have different vertical and horizontal dimensions in a top view.

12. A switch device, comprising:

an upper housing and a lower housing that are connectible by a single pushing operation on the upper housing;

an operating body that is held between the upper and lower housing and is inserted into the lower housing by a push operation, and which includes an operating body-side guide portion protruding from a lower surface of the operating body, and at least one protruding piece that extends laterally with respect to the operating body-side guide portion and that is captured by the upper housing;

a housing-side guide portion that protrudes from a bottom surface of an interior of the lower housing and, together with the operating body-side guide portion, guides movement of the operating body between the upper and lower housing based on the push operation; and an elastic body that is provided between the operating body and the lower housing on an outer side of the operating body-side guide portion and the housing-side guide portion and applies an elastic force to the upper housing and the operating body, wherein the lower housing, the elastic body, the operating body, and the upper housing are assembled together by the single pushing operation that connects the upper housing to the lower housing.

* * * * *